(12) United States Patent
Gutiérrez Salazar et al.

(10) Patent No.: US 12,489,604 B2
(45) Date of Patent: Dec. 2, 2025

(54) METHOD FOR ENCRYPTING DATA BY MEANS OF MATRIX OPERATIONS

(71) Applicants: Jaime Ricardo Gutiérrez Salazar, Santiago (CL); Jaime Andrés López Lisboa, Santiago (CL)

(72) Inventors: Jaime Ricardo Gutiérrez Salazar, Santiago (CL); Jaime Andrés López Lisboa, Santiago (CL)

(*) Notice: Subject to any disclaimer, the term of this patent is extended or adjusted under 35 U.S.C. 154(b) by 268 days.

(21) Appl. No.: 18/248,223

(22) PCT Filed: Oct. 10, 2020

(86) PCT No.: PCT/CL2020/050126
§ 371 (c)(1),
(2) Date: Apr. 6, 2023

(87) PCT Pub. No.: WO2021/174373
PCT Pub. Date: Sep. 10, 2021

(65) Prior Publication Data
US 2023/0379137 A1 Nov. 23, 2023

(51) Int. Cl.
*H04L 9/06* (2006.01)
*G06F 17/16* (2006.01)
(52) U.S. Cl.
CPC ............... *H04L 9/06* (2013.01); *G06F 17/16* (2013.01)
(58) Field of Classification Search
CPC ..... H04L 9/06; H04L 2209/16; H04L 9/0631; G06F 17/16; G09C 1/04; G09C 1/02
See application file for complete search history.

(56) References Cited

U.S. PATENT DOCUMENTS

| | | | | |
|---|---|---|---|---|
| 7,464,130 B2* | 12/2008 | Hubert | ............... | G06F 7/724 708/607 |
| 8,533,493 B1* | 9/2013 | Tzeng | ............... | H04L 9/06 713/189 |
| 10,594,480 B2 | 3/2020 | Samid | | |
| 2013/0259224 A1* | 10/2013 | Lee | ............... | G06F 7/582 708/250 |
| 2024/0187213 A1* | 6/2024 | Michaels | ............... | H04L 9/0656 |

FOREIGN PATENT DOCUMENTS

RU    2374770 C1    11/2009

OTHER PUBLICATIONS

International Search Report and Written Opinion for PCT/CL2020/050126 (May 19, 2021), 11 pp.

* cited by examiner

*Primary Examiner* — Phy Anh T Vu
(74) *Attorney, Agent, or Firm* — Fox Rothschild LLP

(57) ABSTRACT

A method for encrypting data, comprising: the transformation of a base message into an intermediate message by means of successive matrix rearrangement operations; the definition of a numerical set, which is transformed into a new numerical order, also by means of matrix rearrangement operations; the definition of a substitution alphabet; the establishment of a replacement operation, comprising the replacement of one character of the intermediate message by one character of the substitution alphabet, pursuant to a command defined by the new numerical order, starting from an initial magnitude of displacement, and progressively increasing the magnitude of displacement.

13 Claims, 3 Drawing Sheets

| [A0] | | [A1] | | [A2] | | [B1] | | [B2] | | [C1] | |
|---|---|---|---|---|---|---|---|---|---|---|---|
| 1 | a | h | a4 | l | a4 | 1 | a1 | 1 | c2 | z | c3 |
| 2 | b | o | b4 | h | b4 | 2 | d3 | 2 | a4 | m | c4 |
| 3 | c | l | c4 | e | c4 | 3 | b2 | 3 | e4 | x | c1 |
| 4 | d | a | d4 | c | d4 | 4 | b4 | 4 | d4 | r | e2 |
| 5 | e | * | e4 | * | e4 | 5 | d2 | 5 | e3 | z | a3 |
| 6 | f | c | a3 | o | a3 | 6 | b3 | 6 | b4 | * | b3 |
| 7 | g | ó | b3 | * | b3 | 7 | a4 | 7 | c3 | n | a1 |
| 8 | h | m | c3 | s | c3 | 8 | b1 | 8 | c4 | c | b2 |
| 9 | i | o | d3 | s | d3 | 9 | c4 | 9 | c1 | n | d1 |
| 10 | j | * | e3 | o | e3 | 10 | a2 | 10 | e2 | q | b1 |
| 11 | k | e | a2 | * | a2 | 11 | a3 | 11 | a3 | ? | e1 |
| 12 | l | s | b2 | ó | b2 | 12 | d4 | 12 | b3 | k | d3 |
| 13 | m | t | c2 | m | c2 | 13 | c3 | 13 | a1 | m | d2 |
| 14 | n | á | d2 | t | d2 | 14 | d1 | 14 | b2 | * | a2 |
| 15 | o | s | e2 | h | e2 | 15 | c2 | 15 | d1 | n | c2 |
| 16 | p | * | a1 | a | a1 | 16 | c1 | 16 | b1 | n | a4 |
| 17 | q | h | b1 | á | b1 | 17 | e2 | 17 | e1 | * | e4 |
| 18 | r | o | c1 | o | c1 | 18 | e4 | 18 | d3 | g | d4 |
| 19 | s | y | d1 | y | d1 | 19 | e1 | 19 | d2 | t | e3 |
| 20 | t | ? | e1 | ? | e1 | 20 | e3 | 20 | a2 | n | b4 |
| 21 | u | ↓ | ↓ | ↓ | ↓ | ↓ | ↓ | ↓ | ↓ | ↓ | ↓ |
| 22 | v | 403 | 404 | 405 | 406 | 407 | 408 | 409 | 410 | 411 | 412 |
| 23 | w | | | | | | | | | | |
| 24 | x | | | | | | | | | | |
| 25 | y | | | | | | | | | | |
| 26 | z | | | | | | | | | | |
| ↓ | ↓ | | | | | | | | | | |
| 401 | 402 | | | | | | | | | | |

FIG. 2

METHOD FOR ENCRYPTING DATA BY MEANS OF MATRIX OPERATIONS

CROSS-REFERENCE TO RELATED APPLICATIONS

This application is a National Stage application under 35 U.S.C. § 371 of International Application No. PCT/CL2020/050126 filed Oct. 10, 2020, the disclosure of which is hereby incorporated by reference in its entirety.

TECHNICAL FIELD

The present invention relates to electronic communication by means of cryptographic methods and apparatus using them, where a given data sequence likewise an intelligible text, is transformed into an unintelligible data sequence by means of transposing data or data groups or by means of replacing them by other data, according to a predefined system, based upon rearranging numeric series, sequences or successions. Particularly, it deals with a block ciphering algorithm, with symmetric keywords whose strength to withstand attempts to decipher such keywords does not rely upon the keywords' length.

INDUSTRY APPLICATION

This can be applied to protect digital messages and different electronic transactions being exchanged between human correspondents or between digital communication devices, computers, or other equipment or devices connected to the Internet.

BACKGROUND ART

All cryptographic systems have their concealing mechanism based upon two operations applied independently or combined: "transposing" (or "rearranging") the characters of a "base message" (information we want to transmit to a recipient correspondent, which nowadays can have any digital or analogue message format); and the "substitution" (replacement) of the characters within the "base message". The effect we look to achieve is the ciphering (concealment) of the "base message" to all those who don't know which transposing and substitution operations were performed; and to all those who ignore what sequence was used to apply such operations, in order to transform the "base message" into a "ciphered message".

If we fragment the "base message" into blocks of characters to be processed by a ciphering method, we can refer to it as a "block ciphering". Due to the calculation capability and speed of computers, the alternative is to cipher every data chunk or character within the base message and we refer to it as a "stream ciphering". If the key required to deciphering the message is the same used to cipher it, we have a "symmetric" cryptographic system. If different keywords are required for ciphering and deciphering, we have an "asymmetric" cryptographic system.

Nowadays, there are several systems of these two types being usually applied to transmit commercial transactions; email messages; files of various digital content; and transmission via Internet of a number of information packets of "sensitive" matters or "ordinary" nature. Among these systems, we can find, for example:

RSA: Uses symmetric algorithm RC5 (designed in 1994), which handles 32, 64, or 128-bit blocks (being 64 bits the suggested preference), with keyword lengths of up to 1024 bits (being 128 bits the suggested preference), giving a "keyspace" (or number of possible keywords) of $2^{128}=3.40\times10^{38}$); and 18 to 20 ciphering rounds (being 12 rounds the suggested preference).

Between 1991 and 2007, RSA Security—as the patent assignee, offered rewards to those who would be able to "crack" the keywords up to 2048 bits, so by 2003 the recommendation was to use 1024-bit keywords (which is equivalent to 128 characters), increasing the size of the keyspace to $(2^{1024})=1.79\times10^{308}$. Among recent results, on December 2019, a successful attack to a 795-bit keyword was announced.

AES: Uses only 128-bit blocks; with 128-bit keywords (and 10 ciphering rounds); 192-bit keywords (and 12 ciphering rounds); and, 256-bit keywords (with 14 ciphering rounds), for keyspaces of $2^{128}$ (=$3.40\times10^{38}$); $2^{192}$ (=$6.27\times10^{57}$); y $2^{256}$ (=$1.15\times10^{77}$), respectively.

TWOFISH: The algorithm works with 128-bit blocks, 12 ciphering rounds and keyword sizes of 128, 192 and 256 bits (leading to a keyspace of up to $(2^{256})=1.15\times10^{77}$).

IDEA: Works with 64-bit blocks and a 128-bit keyword (which is equivalent to a keyspace of $2^{128}$) used to generate, through successive rotations and fragmentations, 52×16-bit keywords.

DES: Created in 1975, working with 64-bit blocks, 16 ciphering rounds and 56-bit keywords, had a keyspace of ($2^{56}=7.2\times10^{16}$) combinations. It was replaced in 1999 by 3DES, which works with 3×56-bit keywords (leading to a key space of $(2^{56})^3=3.74\times10^{50}$).

Nowadays, the size of keywords keeps growing as in 2012 an online free service was readily available which was able to crack 56-bit DES keywords not later than within 26 hours [https://crack.sh].

Improvement Areas

Most of the systems available today, base their "strength" on the length of their ciphering keywords. "Strength" would be the capability to withstand "brute-force" attacks; that is to say, the capability to resist attempts to "guess" the keyword by testing every possible keyword option based on the length of the keyword; and, based on the different types of characters included in the keyword. Thus, the more characters the keywords contain, the greater the "strength" of the system.

For example, in AES-128, the 128-bit keywords (equivalent to 16 characters) generate a key space of ($2^{128}$); while for AES-192, the 192-bit keywords (equivalent to 24 characters) generate a keyspace of ($2^{192}$); and for AES-256, the 256-bit keywords (equivalent to 32 characters) generate a keyspace of ($2^{256}$). Given the achievements in computer design, this has turned into a weakness of cryptographic systems as, with integration densities of $10^9$ transistors per chip (in 2004) and close to ($5\times10^{10}$) transistors per chip (in 2018), the available computing power makes 128-bit keywords—and even 192-bit keywords, to be considered "not safe", even for "non-sensitive" SW applications.

On the other hand, as the creation of "big length" keywords makes it difficult to guarantee in practice, the diversity (randomness) of the keyword generation and to ensure their handling and diffusion to interested parties, the use of "lengthy" keywords introduces another weakness on existing systems. This is because it forces you to establish some keyword-management mechanism including generating "true" random keywords, which will make it more difficult to the user "remembering" the generated keywords (1024-bit keys are equivalent to 128 alphanumeric—or other type, characters).

Furthermore, some of the existing systems have their "ciphering" mechanism based upon a low complexity transposing and substitution operations, making it necessary to counteract this effect, by applying several "ciphering rounds"; that is to say, by repeating (between 10 to 16 times) the steps required by the ciphering, which can also be an additional inconvenient, as that would affect the deciphering process.

Accordingly, the technical problem addressed by the invention corresponds on how to provide a safer method, which does not imply keywords hard to remember, nor an excessive amount of ciphering rounds.

Novelty of Invention

Referring to aspects on other issued patents similar to the present invention, the use of numeric sequences to carry out a ciphering/deciphering process is mentioned by U.S. Pat. No. 7,995,748-B 2 "Method and Apparatus for providing encryption/decryption using two sequences of numbers", published on 2011 Aug. 9. However, such a system restrains the type of numeric sequences to a subset of the numeric sequences that can be used in the present invention.

In fact, in said Patent the proposed method is based upon matrices of size (8×8), as it works with Solutions to the "Knight's Tour Problem" (which consists on visiting, with a chess Knight, the whole (8×8) chessboard, avoiding to visit any cell twice, while tracing a continuous path), and whose Solutions are estimated to be $(1.06 \times 10^{14})$ [Ref.: "Some enumerations of Classes of Knight's Tours" by G. P. Jelliss in his web site "Knight's Tours Notes" [_www.mayhematics.com/t/8a.html], however the amount of sequences it is possible to generate for an (8×8) matrix with the method presented hereby is 64! (Factorial of $64=1.26 \times 10^{89}$), which is a much greater number than the first one.

The use of Solutions to the "Knight's problem" as numeric sequences is also mentioned in the ciphering method described on Patent Application No. US 2016/379527, published on 2016 Dec. 29 (but not granted, as it was abandoned by the inventor), where another and different way to use the Solutions was proposed for the ciphering process.

In both cases, although there is still no repertoire available for the little more than $(10^{14})$ solutions, in 1882 the French abbot Philippe Jolivald published more than 413.000 solutions to the "Knight's Problem", which would greatly facilitate a "brute-force" attack (by means of an automatic algorithm).

The present invention does not use the Solutions to the "Knight's Tour Problem" in any of the stages of the encryption method. Likewise, the use given on the present invention to the numeric sequences, series and successions, has no relationship with the use given in the two previously referred Patents. Furthermore, the present invention considers the use of numeric arrangements of which, the sequences are only a particular case from the many ones it would be possible to use.

SUMMARY OF THE INVENTION

According to the invention, it solves the necessary randomness for the generated keys, as in the present method the keywords are not random, as they are produced when coding the actions performed on each stage where they are to be applied.

According to the invention, it also solves the weakness of current systems, related to obtaining the method's strength through the length of the keyword (1024-bits or bigger), as its strength is achieved through the different operations performed in the ciphering process, combined with the great number of options available for each one of those operations. In fact, the keywords to be used (in the preferred embodiment) are not greater than 320 bits (40 alphanumeric—or other type, characters) despite which the method's strength is no affected.

According to the invention, the latter also solves the weakness produced by the need to manage big size keywords, as the keywords are to be "designed" and "coded" according to the desired effect to be achieved through the involved operations; or they are to be selected from a repertoire of previously generated keywords. Thus, even if the keys are selected (randomly or sequentially) from a digital repository, they are not generated randomly, but by combinatorics.

According to the invention, the possibility of improving the method's strength is also available by performing different changes in some of the parameters driving the amount of options to be explored in a "brute-force" attack (by means of an automatic algorithm), which ends up being comparable to the one in RSA-1024 ($2^{1024}=1.79 \times 10^{308}$). Among them, it is worth noting:

*By increasing the size of the "numeric sequence" to use: for example, when using a set of 64 numbers, the number of different ways of arranging them is 64! (Factorial of $64=1.26 \times 10^{89}$). On the other hand, if the set is increased to 128 numbers, the amount of different arrangements rises to 128! (Factorial of $128=3.85 \times 10^{215}$);

*By increasing the number of numeric arrangements to use: for example, while using two numeric sets of 64 numbers each, the number of different ways of arranging them increases to (64!×64!): Factorial of 64× Factorial of 64; that is to say, $1.61 \times 10^{178}$, but if we use two sets of 128 numbers, this rises to 128!×128! (Factorial of 128× Factorial of 128; that is to say, $1.48 \times 10^{431}$);

*By increasing the number of "substitution alphabets" used: for example, in a 26-character alphabet, the number of different alphabets we can generate is 26! (Factorial of $26=4.03 \times 10^{26}$). But if we use two 26-character alphabets, that amount increases to $(26!)^2$ ([Factorial of 26] squared; that is to say, $1.62 \times 10^{53}$);

*By increasing the size of the "substitution alphabet" used: for example, if we double the number of characters (without repeating characters, for example, by including uppercase and lowercase; or by adding special characters, and accented vowels) the amount of different alphabets increases to 52! (Factorial of $52=8.06 \times 10^{67}$).

*Thus, if we only combine the effect of using a numeric arrangement of 128 numbers and four 26-character "substitution alphabets", we would have a strength greater than the one of RSA-1024, as the number of different options would be $(128! \times (26!)^4)$ that is to say, $(1.02 \times 10^{322})$.

Finally, according to the invention and to what is stated in the previous paragraph, we could also mitigate the inconvenience of having to apply several "ciphering rounds" in order to improve the method's strength (although applying several "ciphering rounds" is also one of the ways to improve the method's strength), as this results in the ease of application of the ciphering and deciphering, without this meaning a decrease in the number of options that would need to be explored, in a "brute-force" attack (by means of an automatic algorithm).

Description of a Preferred Embodiment

The method presented hereby allows the ciphering of a data sequence ("base message"), digitally coded by means of performing a preliminary stage and by applying three (3) processes where data transposing and substitution take place, making it unintelligible ("ciphered message") to a third party ignoring the method applied to produce the ciphering. For description purposes, we will suppose the data sequence to include "alphanumeric characters", although as stated in the attached claims, their composition can be much more extensive and varied.

Preliminary Stage: Definitions and Previous Steps
Define a "base message" to be ciphered;
Define four operations to rearrange the "base message";
Choose a "block size" (with 64, 128 or 256 characters) to use in the ciphering;
Choose a "matrix size" to contain the "base message", according to the defined "block size": (16×4) for 64-character blocks; (16×8) for 128-character blocks; and (16×16) for 256-character blocks;
Define a "numeric set" to be used in the ciphering process, the same size of the "block size". The "numeric set" includes consecutive numbers from "1" to the size of the chosen block (64, 128 or 256);
Define four operations to rearrange the "numeric set";
Define a "substitution alphabet" (alphabetic, 26-character);
Define keywords CK1, Ck2 and CK3 which are to be used by a dispatch correspondent to generate the "ciphered message" and by a recipient correspondent to decipher said "ciphered message";
Transcribe the "substitution alphabet" to a matrix [A0] of size (26×1) where "26" is the number of characters in the alphabet;
Fragment the "base message", according to the chosen "block size";
Transcribe the "base message" to multiple matrices [A1]. The number of matrices to use will depend upon the quotient between the number of characters in the "base message" and the "block size";
Transcribe the "numeric set" to a matrix [B1] the same size than matrix [A1].

Process 1: Rearranging the "base message" [A1] to generate an "intermediate message" [A2]
Operation 1: transpose the rows in [A1] matrices, based upon what indicates keyword CK1;
Operation 2: transpose the columns in [A1] matrices, based upon what indicates keyword CK1;
Define concentric parallelograms in [A1] matrices;
Operation 3: rotate the characters in each concentric parallelogram, based upon what indicates keyword CK1;
Operation 4: reflect [A1] matrices, based upon what indicates keyword CK1;
While applying the four operations just described, matrices [A2] are produced containing an "intermediate message".

Process 2: Rearranging the "numeric set" [B1] to generate a "new numeric arrangement" [B2]
Operation 1: transpose the rows in [B1] matrices, based upon what indicates keyword CK2;
Operation 2: transpose the columns in [B1] matrices, based upon what indicates keyword CK2;
Define concentric parallelograms in [B1] matrices;
Operation 3: rotate the characters in each concentric parallelogram, based upon what indicates keyword CK2;
Operation 4: reflect [B1] matrices, based upon what indicates keyword CK2;
While applying the four operations just described, matrices [B2] are produced, containing a "new numeric arrangement".

Process 3: Ciphering the "intermediate message" [A2] to generate "ciphered message" [C1]
Perform the character substitution to the "intermediate message", based upon what indicates keyword CK3 on how to use the "substitution alphabet" with the "new numeric arrangement" to generate the "ciphered message" [C1];
Transmit to the recipient correspondent by means of an unprotected channel, the "ciphered message";
Transmit to the recipient correspondent by means of a protected channel previously agreed upon, the original "numeric set"; the keywords CK1, CK2 and CK3; and the "substitution alphabet".

BRIEF DESCRIPTION OF THE DRAWINGS

The invention can be more fully understood from the following description when read together with the accompanying drawings which describe an implementation example on (5×4) matrices and some of its corresponding optional alternatives, which are only provided with explanatory purposes and not intending to limit its implementation and use in any way, or with respect to the defined in the attached claims:

FIG. 1 shows an example of operations performed on a base message, numeric set, and intermediate message.

FIG. 2 shows an example of positional relationships of a numeric set, new numeric arrangement, and substitution alphabet.

FIG. 1: Application Example

Matrix [A1] (101 in the Figure), shows a generic example of "base message". Matrices [A1a], [A1b], [A1c] and [A2] (102 to 106 in the Figure) show an example of how the elemental operations described in keyword CK1, are to be applied to rearrange the initial "base message" to transform it into matrix [A2], with an "intermediate message" (106 in the Figure).

Matrix [B1] (201 in the Figure) shows a generic example of a "numeric set". Matrices [B1a], [B1b], [B1c] and [B2] (202 to 206 in the Figure) show an example of how the elemental operations described in keyword CK2, are applied to rearrange the initial "numeric set" to transform it into matrix [B2], with a "new numeric arrangement" (206 in the Figure).

Matrix [C1] (303 in the Figure) shows an example of how the "intermediate message" on matrix [A2] (302 in the Figure) is transformed into a "ciphered message" by means of the "new numeric arrangement" [B2] (301 in the Figure), by applying the "substitution function" described in keyword CK3.

Figure 1:
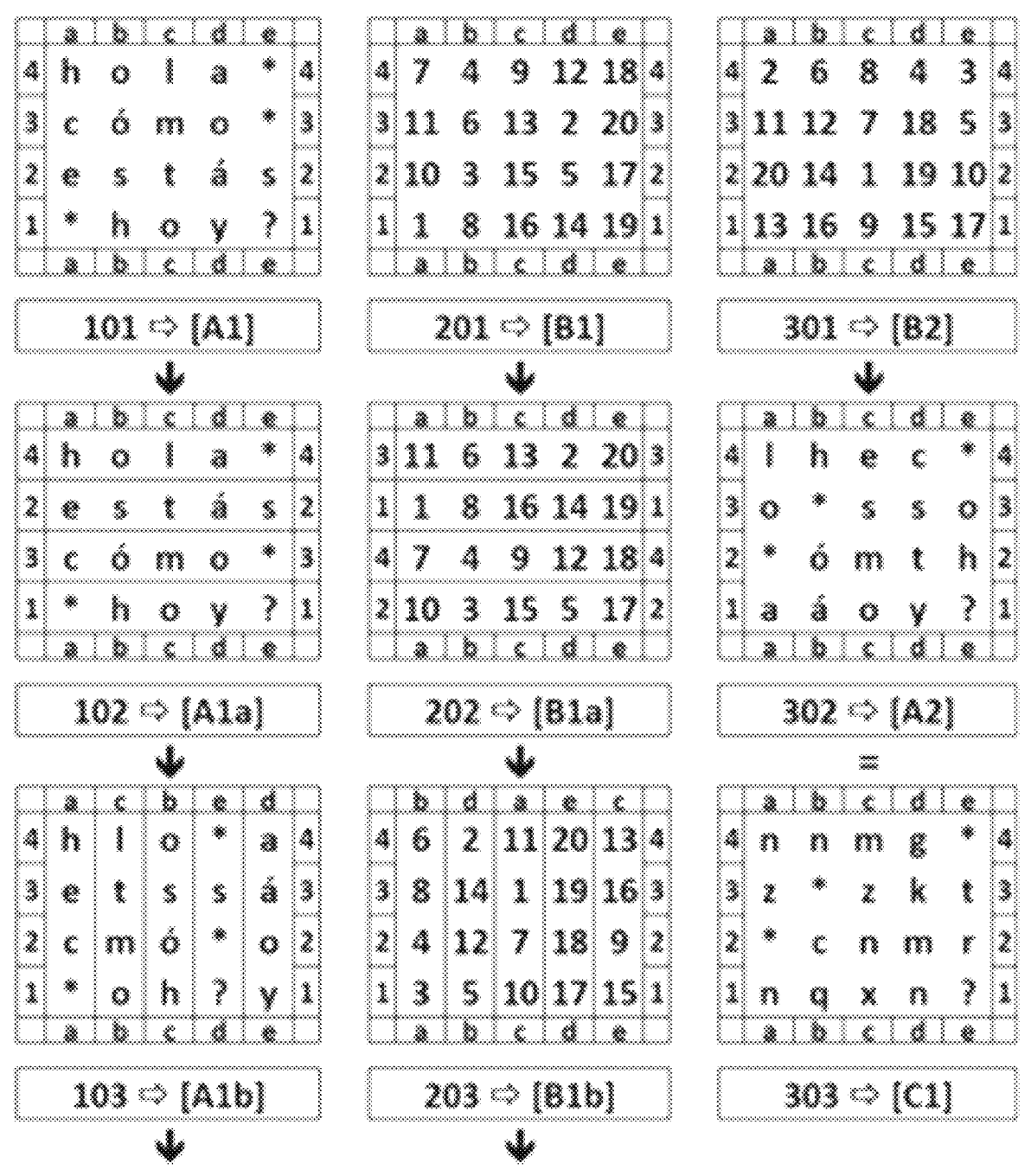
Figure 1:
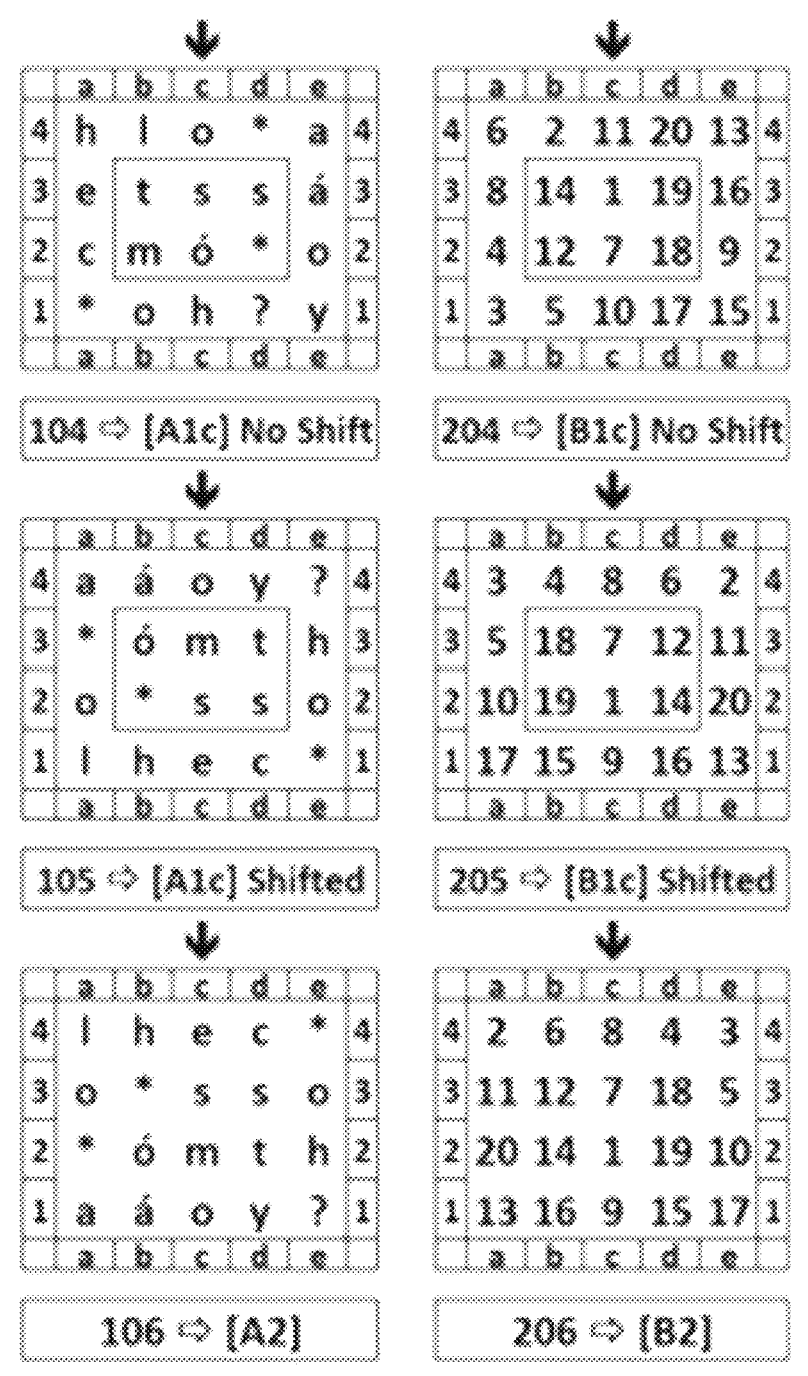

The same already mentioned matrices on FIG. 1, illustrate—when reviewed backwards, the deciphering operation on message from matrix [C1] (303 in the Figure) to obtain the "base message" shown in matrix [A1] (101 in the Figure).

FIG. 2: Components for each matrix, in positional relationship to the "numeric set", to the "new numeric arrangement", and to the "substitution alphabet".

The 6 matrices in the Figure, show in detail—for the example described in the previous Figure, the component characters for each matrix (402, 403, 405, 407, 409 and 411 in the Figure), the sequence numbers for the alphabet (401) and the coordinates, for character components for those matrices (404, 406, 408, 410 and 412 in the Figure), for each position of the "new numeric arrangement" (409 and 410 in the Figure): matrices [A1] and [A2], show the original "base message" (403 and 404 in the Figure) and the "intermediate message" (405 and 406 in the Figure); matrices [B1] and [B2], show the "initial numeric set" (407 and 408 in the Figure) and the "new numeric arrangement" (409 and 410 in the Figure); finally, matrix [C1], shows the "ciphered message" (411 in the Figure).

DETAILED DESCRIPTION OF THE FIGURES

Example: FIG. 1—Application of the Method described in the Invention:
Ciphering Process:
On this Figure, a complete example showing all of the steps required to achieve the ciphering. Said example has been developed using a (5×4) matrix to cipher a 20-character message, to be delivered to a recipient correspondent, after performing the steps (processes) described as follows: (1)→(2)→(3).

1) Generate an "intermediate message":
(101) Original (Secret) "Base Message":
Knowing that in order to cipher a (5×4) "base message" we have to create an "intermediate message" with keyword "CK1=4231ACBED-04V", in FIG. 1 we can see in detail, every necessary step of the process to generate said "intermediate message":

(102) Transpose rows in matrix [A1]:
With the first 4 characters ("4231") of keyword CK1, we vertically transpose the rows in matrix [A1], following the instructions in the keyword, by changing (in this case) its relative position from "4321" to "4231" to generate matrix [A1a] shown in FIG. 1. Thus, row "4" in [A1] keeps its $4^{th}$ position (top end in [A1a]); row "3" in [A1] moves from $3^{rd}$ in [A1] to $2^{nd}$ row in [A1a] (counting from lower end); row "2" in [A1] moves from $2^{nd}$ in [A1] to $3^{rd}$ row in [A1a]; and row "1" in [A1], keeps its position (lower end in [A1a]);

(103) Transpose columns in matrix [A1a]:
With the next 5 characters ("ACBED") in keyword CK1, we horizontally transpose the columns in matrix [A1a], following the instructions in the keyword, by changing its relative position from "ABCDE" to "ACBED" in order to generate matrix [A1b] shown in FIG. 1.

Thus, column "A" in matrix [A1a] keeps its position as $1^{st}$ column (leftmost column) in matrix [A1b]; column "B" moves from $2^{nd}$ column in matrix [A1a] to the $3^{rd}$ column in [A1b]; column "C" moves from $3^{rd}$ column in matrix [A1a] to the $2^{nd}$ column in matrix [A1b]; column "D" moves from $4^{th}$ column in matrix [A1a] to the $5^{th}$ column (rightmost column) in matrix [A1b]; and, column "E" moves from $5^{th}$ column in matrix [A1a] to the $4^{th}$ column in matrix [A1b]. (See FIG. 1).

(104) Concentric Parallelogram Definition in [A1b] (No Shift):
In order to facilitate transposing (in the next step) the concentric parallelograms in matrix [A1c], the position's distribution of the "base message" is shown in matrix [A1b] with rows and columns already transposed, but before the rotation of characters defined in keyword CK1.

(105) Transpose the Concentric Parallelograms in matrix [A1c]:
With the next 3 characters ("-04") in keyword CK1, we transpose the cell's content in the concentric rectangles shown in matrix [A1c] "no shift" (104 in FIG. 1), by moving such content by "4" positions counterclockwise (the counter clock rotation is indicated by the "minus" sign "–").

Thus, (for example) characters "t-s-s" in the upper row of the inner concentric rectangle in matrix 104, move to coordinates (d, 3)-(d, 2)-(c, 2) in matrix [A1c] "Shifted" (105 in FIG. 1) of the same rectangle; while (for example) characters "h-l-o" in matrix 104 (in FIG. 1) from coordinates (a, 4)-(b, 4)-(c, 4), move to coordinates (b, 1)-(a, 1)-(a, 2) in the external concentric rectangle in matrix [A1c] "Shifted" (105 in FIG. 1).

(106) Transpose matrix [A1c] by means of a reflection process, obtaining matrix [A2]:
With the last character ("V") in keyword CK1, the matrix generated in process (105) is vertically reflected, to generate matrix [A2], which is the matrix of "intermediate message" (106 in FIG. 1); thus, as we are performing a "vertical reflection", a new transposing is produced to the rows of the matrix, making: row 4 (top end of [A1c] in 105), to move to row 1 (lower end of [A2] in 106); row 3 of [A1c] in 105 moves to row 2 of [A2] in 106; and so on, until every row in matrix [A1c] has been transposed forming [A2] (see FIG. 1).

Structure and Length of Keyword CK1:
So far, we can say the structure and length of keyword CK1 are defined by:
CK1="(N) Rows Rearrangement+"(M) Columns Rearrangement"
+ "Rotation Direction ("+/–")+"Rotation Displacement (G)"
+ "Type of Reflection" ("H"=Horizontal; "V"=Vertical; "R"=Right Diagonal; "L"=Left Diagonal")="N" characters+"M" characters+1 character
+2 digits +1 character.
In the example, keyword CK1 length is =4+5+1+2+1=13 characters=104 bits.

2) Generate a "New Numeric Sequence" (matrix [B2]):
(201) Define the "numeric set" [B1]:
Supposing a "numeric set" has been defined—or selected from a repository (matrix [B1]), and according to keyword "CK2=3142BDAEC+03H", in FIG. 1 we can see in detail every step in the process of generating the "new numeric arrangement", including the following stages:

(202) Row Transposing in matrix [B1a]:
With the first 4 characters ("3142") in keyword CK2, we vertically transpose the rows in matrix [B1], by following the instructions in the keyword, changing its relative position from "4321" to "3142" to generate matrix [B1a] shown in FIG. 1.

Thus, row "4" moves from $4^{th}$ position (top end in matrix [B1]) to $2^{nd}$ row in matrix [B1a], counting from lower end; row "3" moves from $3^{rd}$ row in [B1], to the $4^{th}$ row in matrix [B1a]; row "2" moves from $2^{nd}$ row in [B1], to the $1^{st}$ row in matrix [B1a]; and, row "1" moves from $1^{st}$ row in [B1], to the $3^{rd}$ row in matrix [B1a]; (See FIG. 1).

(203) Transpose columns in matrix [B1b]:
With the next 5 characters ("BDAEC") in keyword CK2, the columns in matrix [B1a] are transposed horizontally, following the instructions in the keyword, changing its relative position from "ABCDE" to "BDAEC" generating matrix [B1b].

Thus, column "A" moves from the 1$^{st}$ position (leftmost column) in matrix [B1a] to the 3$^{rd}$ column in matrix [B1b]; column "B" moves from the 2$^{nd}$ position in [B1a] to the 1$^{st}$ column in [B1b]; column "C" moves from the 3$^{rd}$ in [B1a] to the 5$^{th}$ column in matrix [B1b]; column "D" moves from the 4$^{th}$ in [B1a] to the 2$^{nd}$ column in matrix [B1b]; and, column "E" moves from the 5$^{th}$ in [B1a] to the 4$^{th}$ column in matrix [B1b]. (See FIG. 1)

(204) Define Concentric Parallelograms in [B1c] (No shift):

In order to facilitate transposing (in the next step) the concentric parallelograms in matrix [B1c], the position's distribution of the "numeric set" is shown in matrix [B1b] "No Shift" with rows and columns already transposed, but before the rotation defined in keyword CK2.

(205) Transpose the Concentric Parallelograms in matrix [B1c] (Shifted):

With the next 3 characters ("+03") in keyword CK2, we transpose the cell's content in the concentric rectangles shown in matrix [B1b], by moving said content by "3" positions clockwise (that rotation is indicated by the "plus" sign "+").

Thus, (for example) numbers "14-1-19" in the upper row of the inner concentric rectangle in matrix [B1c] "No Shift", move to the bottom row of the same rectangle, as "19-1-14; while (for example) number "6" in the top row of the external rectangle in matrix [B1c] "No Shift" (along with the rest of the numbers in that concentric rectangle) move three positions to the right (see matrix [B1c] in FIG. 1).

(206) Transpose matrix [B1c] by means of a reflection process, obtaining matrix [B2]:

With the last character ("H") in keyword CK2, the matrix [B1c] generated in the previous step, in order to generate matrix [B2], which is the matrix of the "new numeric arrangement" (206 in FIG. 1); thus, as we are performing a "horizontal reflection", a new transposing is produced to the columns of the matrix, making: column 1 (leftmost column), to move to position 5; column 2 to move to position 4; and so on, until every column in the matrix has been transposed (see FIG. 1).

Structure and Length of keyword CK2:

So far, we can say the structure and length of keywords CK1 and CK2 are defined by the same components:

$CK2$ = "($N$) Rows Rearragnement" +

"($M$) Columns Rearrangement" + "Rotation Direction ("+/−") +

"Rotation Displacement ($G$)" + "Type of reflection" ("$H$" = Horizontal;

"$V$" = Vertical; "$R$" = Right Diagonal; "$L$" = Left Diagonal) =

"$N$" characters + "$M$" characters + 1 character + 2 digits + 1 character.

In the example, the length of keyword CK2 is =4+5+1+2+1=13 characters=104 bits.

3) Generate a Ciphered Message:

Using the "new numeric arrangement" (301: matrix [B2]) and the "intermediate message" (302: matrix [A2]), to generate the "Ciphered Message" (303: matrix [C1]) with keyword CK3="01A":

(301) "New numeric arrangement":
Included just for visual reference (the same in process 206).

(302) "Intermediate Message":
Included just for visual reference (the same in process 106).

(303) "Ciphered Message":
With the 3 characters ("01A") in keyword CK3, we perform the ciphering, by substituting the text in the "intermediate message", by advancing the characters defined in the alphabet, the number of positions as indicated in the "new numeric arrangement", thus generating matrix [C1] by reading the arrangement starting on position ("01") and by touring the sequence in an ascending way (the tour direction is indicated by "A" as in "Ascending"), as defined in the keyword. In FIG. 1, we can see in detail every step of the process while ciphering the message.

Thus, (for example) starting with position "01" in the "new numeric arrangement" (corresponding to coordinates (c, 2) in matrix [B2]) indicates character "m" at coordinates (c, 2) in matrix [A2], has to be substituted at coordinates (c, 2) in matrix [C1], by the character 1 position ahead ("01A"). The next character to letter "m" in the substitution alphabet is letter "n". Therefore, at coordinates (c, 2) in matrix [C1], character "m" from the "intermediate message", is substituted by character "n" in the ciphered message.

For position "02" in the "new numeric arrangement" (at coordinates (a, 4) in matrix [B2]) character "1" (at coordinates (a, 4) in matrix [A2]) is substituted by character "n" (which is 2 positions ahead to letter "l" in the substitution alphabet) and inserted at coordinates (a, 4) in matrix [C1].

For position "03" in the "new numeric arrangement" (at coordinates (e, 4) in matrix [B2]), the character in the "intermediate message" is "*" used as word spacer, which is not to be substituted so at coordinates (e, 4) in matrix [C1] the same character "*" is inserted.

With position "04" (coordinates (d, 4) in [B2]), character "c" in matrix [A2], is substituted at coordinates (d, 4) in matrix [C1] by character "g" (which is 4 positions ahead to letter "c" in the substitution alphabet); and so on, until substituting every character in the "intermediate message", ending the ciphering and producing matrix [C1].

As we might suppose, when the position number in the "new numeric arrangement" exceeds the number of characters in the substitution alphabet being used, we have to consider it as a circular string, moving to the 1$^{st}$ character for an ascending tour; or to the last character, for a descending one.

Structure and Length of keyword CK3:

As could be seen, the structure and length of keyword CK3 are defined by:
CK3="Starting Position to Initiate Substitution"
+ "Touring Direction (A=Ascending/D=Descending)"
In the example, the length of keyword CK3 is =2 digits+1 character=3 characters=24 bits.

FIG. 2: Components for each matrix, in positional relationship to the initial "numeric set", to the "new numeric arrangement" and to the "substitution alphabet".

FIG. 2 shows the content's detail of each of the 6 matrices in the example developed in FIG. 1, for every position of the "substitution alphabet" [A0]; for the "base message" [A1]; for the "intermediate message" [A2]; for the "numeric set" [B1]; for the "new numeric arrangement" [B2]; and for the "ciphered message" [C1].

Matrix [A0]: Substitution Alphabet.
(401): Positions "1" to "26" for the characters in the "substitution alphabet";
(402): Text for the alphabet with the simplest distribution for its characters which might be used for substitution, while ciphering the "intermediate message".

Matrix [A1]: "Base Message"
(403): Original text for the secret "base message" in the developed example;
(404): Coordinates for each character of the "base message" in matrix [A1].
Matrix [A2]: "Intermediate Message"
(405): Transposed text for the "intermediate message" in the example;
(406): Coordinates for each character of the "intermediate message", in matrix [A2].
Matrix [B1]: "Initial Numeric set"
(407): Positions "1" to "20" for the "numeric set" used in the example;
(408): Coordinates of each position of the "numeric set", in matrix [B1].
Matrix [B2]: "New numeric arrangement"
(409): Positions "1" to "20" for the "new numeric arrangement" generated in the example;
(410): Coordinates for each position for the "new numeric arrangement", in matrix [B2].
Matrix [C1]: "Ciphered Message"
(411): Text for the "ciphered message" generated in the example;
(412): Coordinates for each character of the "ciphered message", in matrix [C1].

Deciphering Process:

In FIG. 1, the described detail to explain the ciphering example, can also be used to explain all of the necessary steps for the deciphering process. Supposing the dispatch correspondent has sent the ciphered message to its addressee; that he has received it (through a non-protected channel) along with the public numeric set; and that he has also received the corresponding keywords (through a protected channel previously agreed upon), the next steps are described as follows for the deciphering process (notice the step numbers of the ciphering process have been kept, in order to illustrate the applied sequence and to make it more evident the fact that in order to "decipher", we have to revert the effect of the "ciphering"):

$$(1a \rightarrow 1d) \rightarrow (3) \rightarrow (2d \rightarrow 2a)$$

1 Generate the "New Numeric Arrangement" (matrix [B2]):

With the original "numeric set" (matrix [B1]) and by using keyword "CK2=3142BDAEC+03H" received by the addressee from the dispatch correspondent, the generation of the "new numeric arrangement" can be performed, with a process including the following operations:

1a) Transpose rows in matrix [B1], generating matrix [B1a] shown in FIG. 1;
1b) Transpose columns in matrix [B1a], generating matrix [B1b] shown in FIG. 1;
1c) Transpose concentric parallelograms in matrix [B1b] "No Shift", generating matrix [B1c] shown in FIG. 1;
1d) "Horizontal reflection" of matrix [B1c], generating matrix [B2] shown in FIG. 1;
3) Recuperate the "Intermediate Message" from the "Ciphered Message":

Taking the Ciphered Message [C1] and the keyword CK3="01A" received from the dispatch correspondent, in FIG. 1 we can see in detail the process of recuperating the "intermediate message" by means of reverting the substitution operations performed by using keyword CK3 to generate matrix [A2]:

As in the process of ciphering the message, what we did was to substitute each character from the "intermediate message" by using the positions of the "new numeric arrangement" to "advance" the characters, the number of characters indicated by the position of the numeric arrangement where the substitution is taking place, in order to recover the "Intermediate Message", it will only be necessary to "recede" the characters of the ciphered message, the number of positions in the substitution alphabet indicated by the position of the numeric arrangement to which the substitution is being applied.

Thus, for position "01" of the ciphered message (letter "n" at coordinates (c, 2) in matrix [C1]), we will have to "go back" 1 position from letter "n"; that is to say at coordinates (c, 2) in matrix [A2], now there should be an "m" (which is the letter before the "n", in the substitution alphabet).

For position "02" of the ciphered message (letter "n" at coordinates (a,4) in matrix [C1]), we will have to "recede" letter "n" in 2 positions; that is to say at coordinates (a,4) in matrix [A2], now there should be a letter "l" (which is the letter two positions before the "n", in the substitution alphabet).

For position "03" of the ciphered message (coordinates (e, 4) in matrix [C1]), there is no change as character "*" is used as word spacer, so at coordinates (e, 4) in matrix [A2] the same character should appear.

And so on, until the tour has visited and replaced every position in matrix [C1].

Finally, we should note that—unless accented vowels are included in the substitution alphabet, while "recovering" the "Intermediate Message" from the "ciphered message", those accented vowels will not be shown in the "intermediate message".

2) Recover the "Base Message" from the "Intermediate Message":

Taking the "Intermediate Message" (matrix [A2] produced by the previous process) and the keyword "CK1=4231ACBED-04V" received from the dispatch correspondent, in FIG. 1 we can see in detail the recovering process of the original "base message" by means of reversing the transposing operations performed using keyword CK1 to generate matrix [A1]. This requires reverting the effects of the applied operations, meaning—in this case, to apply backwards, the 4 different ways to transpose the original (and "secret") base message, all of which is described in keyword CK1.

2d) Reverting the applied Reflection, to obtain matrix [A1c]:

As the keyword indicates "vertical reflection" ("V"=position #13 in keyword CK1) this corresponds to a transposing to the rows in matrix [A2], matrix [A1c] is obtained by moving the $4^{th}$ row (top row) in matrix [A2], to the position of the $1^{st}$ row (bottom end row); and so on, until moving the 4 rows.

2c) Reverting the rotation of the concentric rectangles, to obtain matrix [A1b]:

As the applied rotation was "−04" (transpose characters by 4 positions in levogirus direction), in order to revert the effect, it will be necessary to apply the rotation in the opposite direction "+04"; that is to say, to transpose the characters of the concentric rectangles in matrix [A2], by 4 positions in dextrogirus direction, obtaining matrix [A1b].

Thus (for example), characters "o-m-t" (top row of internal concentric rectangle) at coordinates (b, 3)-(c, 3)-(d, 3) in matrix [A1c], after reverting the rotation are moved to coordinates (c, 2)-(b, 2)-(b, 3) in matrix [A1b]. Likewise (for example), characters "a-a-o-y-?" in the $1^{st}$ row in external concentric rectangle, after reverting the rotation change their coordinates from (a,4)-(b, 4)-(c, 4)-(d, 4)-(e, 4) in matrix [A1c], to (e, 4)-(e, 3)-(e, 2)-(e, 1)-(d, 1) in matrix [A1b].

2b) Reverting Column Transposing, to obtain matrix [A1a]:

As column transposing meant transforming columns "ABCDE" in [A1a] into columns "ACBED" in [A1b], in order to recover matrix [A1a], we only have to reverse the process to matrix [A1b]. Thus, the $1^{st}$ column (leftmost column) in matrix [A1b] does not move as it was not transposed, so it remains unchanged in matrix [A1a]. The $2^{nd}$ column in matrix [A1b] must return to the $3^{rd}$ column (counting from left to right) in matrix [A1a]; and so on, according to converting columns "ACBED" into "ABCDE", to obtain matrix [A1a] (See FIG. 1).

2a) Reverting Row Transposing, to obtain matrix [A1]:

As row transposing (counting from the upper to the lower end) meant to transform rows from "4321" in matrix [A1] into rows "4231" in matrix [A1a], in order to recover matrix [A1] (containing the original "Base Message"), we only have to reverse the transposing process to matrix [A1a]. Thus, the $4^{th}$ row (top end row) in matrix [A1a] does not move as it was not transposed, so it remains unchanged. The $3^{rd}$ row in matrix [A1a] has to move to the $2^{nd}$ row (counting from the upper end) in matrix [A1]; and so on, according to converting rows from "4231" into "4321", to obtain matrix [A1] (See FIG. 1).

Computing Method's Strength, According to the Example Described a) Generating the "intermediate message":

The chosen matrix size is [5×4] so the number of rows (M) is "5" and the number of columns (N) is "4". A "base message" was defined 20-character long (M×N).

The defined operations to rearrange the "base message" are:

a.1) Column Transposing: ($N_{a1}$=120 options).

In order to transpose columns, there are M! (Factorial of M) ways to do it. In the example, 5!=120.

a.2) Row Transposing: ($N_{a2}$=24 options).

In order to transpose rows, there are N! (Factorial of N) ways to do it. In the example, 4!=24.

a.3) Rotating the Concentric Parallelograms: ($N_{a3}$=336 options).

In order to rotate the content of the concentric parallelograms, there are $N_{a3}$ different ways to do it, including ($2^{\wedge}(N/2)$) options considering "positive" (clockwise) or "negative" rotations (counterclockwise) for each one of the (N/2) concentric parallelograms (considering only the integer part of the quotient, as for an odd value for "N", there will be a centric parallelogram of size (M×1) that does not rotate). The expression for the number of options will be:

$N_{a3}$=Product Operator of: {2×[(M+N)−2×(2n+1)]}×($2^{\wedge}$(N\2)), for values of the Product Operator index {n=0 to k}.

With (n=k) such that (N−2k=2), for even values of N; and $N_{a3}$=Product Operator of: {2×[(M+N)−2×(2n+1)]}×[M−2(k+1)]×($2^{\wedge}$(N\2)+1), and the same index.

With (n=k) such that (N−(2k+1)=2), for odd values of N; and (N\2)=integer part of the quotient.

Notice factor [M−2(k+1)] gives the number of options for the "cyclic rotations" of a centric parallelogram, of size (M×1) that will be applicable in matrices with odd values of N.

In the example, for M=5 y N=4, we have k=1:

$$N_{a23} = \{2 \times [(5+4) - 2 \times (2 \times 0 + 1)]\} \times$$
$$\{2 \times [(5+4) - 2 \times (2 \times 1 + 1)]\} \times (2^{\wedge}2) = (\{14\} \times \{6\} \times 4) = 336.$$

a.4) Matrix Reflection: ($N_{a4}$=4 options).

In order to reflect a matrix, there are 4 different ways to do it: horizontally, vertically, left diagonal and right diagonal. Notice diagonal reflections, are truly a combination of a reflection and a rotation, so an [M×N] matrix would become an [N×M] one, making it necessary to keep using [N×M] matrices while applying the method.

a.5) Application sequence of the 4 steps: ($N_{a5}$=24 options).

Additionally, the sequence used to apply the 4 previous steps generate another 4!=24 options, finally rising the number of ways the base message can be rearranged, up to:

Number of Options for process (a):

$$N_a = N_{a1} \times N_{a2} \times N_{a3} \times N_{a4} \times N_{a5}$$

$$= (M! \times N! \times [\text{Product Operator of: } \{2 \times [(M+N) - 2 \times (2n+1)]\} \times$$
$$2^{\wedge}(N/2)] \times 4 \times 4!)$$

$$N_a = (5! \times 4! \times [(\{14\} \times \{6\}) \times 2^{\wedge}2] \times 4 \times 4!) = (120 \times 24 \times [(84) \times 4] \times 4 \times 24)$$

$$= 92{,}897{,}280 =)9.28 \times 10^{\wedge}7)$$

for values of the Product Operator index {n=0 to k}.

If the length (number of characters) in the "base message" would require defining more than one (M×N) matrix, and for each new matrix we change the "numeric set", the "substitution alphabet" and the keywords used for rearranging and ciphering, the number of options Na will increase with their respective contribution, in a multiplying effect.

b) Generate the "new numeric arrangement":

The chosen matrix is [5×4] so the numbers in the "numeric set" are 20, and there are 20! (Factorial of $20=2.43 \times 10^{\wedge}18$) different ways to create the series. If more than one "numeric set" was to be used, each new arrangement will contribute another (M×N)! (Factorial of M×N) options, in a multiplying effect.

The operations defined to rearrange the "numeric set" are:

b.0) Define a "numeric set" ($N_{b0}$=20! options)

b.1) Transpose columns: ($N_{b1}$=120 options).

b.2) Transpose rows: ($N_{b2}$=24 options).

b.3) Rotate concentric parallelograms: ($N_{b3}$=336 options).

b.4) Reflect matrix: ($N_{b4}$=4 options).

b.5) Define a sequence to apply the 4 steps: ($N_{b5}$=24 options).

Number of options for process (b): $N_b = N_{b0} \times N_{b1} \times N_{b2} \times N_{b3} \times N_{b4} \times N_{b5}$ $N_b$=(M×N)!×(M!×N!×Product Operator for {2×[(M+N)−2×(2n+1)]}×$2^{\wedge}$(N/2)×4×4!), for values of the Product Operator index {n=0 to k}.

In the example:

$N_b$=20!×(5!×4!×({14×6}×4)×4×4!)=(2.43×$10^{\wedge}$18)×(120×24×336×4×24)

$N_b$=(2.26×$10^{\wedge}$26)

c) Ciphering of the "intermediate message":

In order to do the cipher, we have to define (or select) a "substitution alphabet". If the alphabet contains P characters, there are P! (Factorial of P) different ways to rearrange that alphabet. In the example, we use a 26-letter alphabet, therefore there will be 26! (Factorial of 26=4.03×10^26) different ways to rearrange the alphabet. If more than one substitution alphabet was to be used, each new alphabet will contribute P! (Factorial of P) options, in a multiplying effect.

In the ciphering, we also use the "new numeric arrangement" contributing with (M×N)! (Factorial of M×N) different ways to create a "new arrangement", so if we decide to use more than one "numeric set" (if the "base message had to be fragmented in several blocks), each new arrangement will contribute (M×N)! (Factorial of M×N) options, in a multiplying effect. It has to be noted that if the used "numeric set" is the same one created in process (b), the number of contributed options would have already been considered in such process.

The operations defined to cipher the "intermediate message" are:

c.0) Define the "substitution alphabet": ($N_{c0}$=26! options)
c.1) Choose the initial substitution cell: ($N_{c1}$=20 options).

In order to cipher the intermediate message, it is necessary to decide which position of the message will be used to begin substituting characters. In a message with (M×N) characters, there are (M×N) different ways to choose which position to start with. In the example, this means 20 different options.

c.2) Choose a touring direction: ($N_{c2}$2=2 options).

In order to cipher the intermediate message, it is also necessary to decide what direction (clockwise/counterclockwise) will be used while touring that message while substituting characters. This contributes with 2 more options.

c.3) Use of a "new numeric set": ($N_{c3}$=20! options)
Does not apply to the described example.
Options for process (c) without changing the numeric set:
$N_c = N_{c0} \times N_{c1} \times N_{c2} = P! \times (M \times N) \times 2$
$N_c = 26! \times (5 \times 4) \times 2 = (4.03 \times 10^{26}) \times 20 \times 2 = (1.61 \times 10^{28})$
All in all, the options for the method will be:
Product Operator for $(N_i) = N_a \times N_b \times N_c$, with i={a, b, c}
Product Operator for $(N_i) = [(M \times N)!] \times [M! \times N! \times ($Product Operator of $\{2 \times [(M+N) - 2 \times (2n+1)]\} \times 2^{(N/2)}) \times 4 \times 4!]^2 \times [P! \times (M \times N) \times 2]$,
for values of the Product Operator index {n=0 to k}.
In the example:

Product Operator for $(N_i) = N_a \times N_b \times N_c$, with $i = \{a, b, c\}$ $$= (9.28 \times 10^{\wedge}7) \times (2.26 \times 10^{\wedge}26) \times$$
$$(1.61 \times 10^{\wedge}28)$$
$$= (3.38 \times 10^{\wedge}62)$$

Based on the described example and what was indicated about "Background Art", it would seem reasonable to choose a matrix size [M×N] of [16×4], [16×8] or [16×16]; this is equivalent to state that the blocks should be of 64, 128 or 256 characters (512, 1024 o 2048 bits). And since the method's strength allows it, it should be enough to use just one "numeric set", one "substitution alphabet" with "P" characters (26 or more) and only one "ciphering round" with blocks of 2048 bits; 2 rounds, with blocks of 1024; and 3 rounds, for blocks of 512 bits.

With 26-character alphabets, the number of options to explore (in a "brute-force" attack) would be:

a) For blocks of 512 bits with one "numeric set", one "substitution alphabet" and three "ciphering rounds" (that is to say, by using three sets of keywords CK1, CK2 and CK3):

Product Operator of $(N_i) = ... = \{[(16 \times 4)!] \times [(16! \times 4! \times (36 \times 28) \times$ $$(2^{\wedge}2) \times 4) \times 4!]^{\wedge}2 \times [26! \times (16 \times 4) \times 2]\}^{\wedge}3 = \{[1.26 \times 10^{\wedge}89] \times$$
$$[1.94 \times 10^{\wedge}20]^{\wedge}2 \times [5.16 \times 10^{\wedge}28]\}^{\wedge}3 = (1.51 \times 10^{\wedge}475)$$

b) For blocks of 1024 bits with one "numeric set", one "substitution alphabet" and two "ciphering rounds" (that is to say, by using two sets of keywords CK1, CK2 y CK3):

Product Operator of $(N_i) = ... = \{[(16 \times 8)!] \times [(16! \times 8! \times$ $$(44 \times 36 \times 28 \times 20) \times (2^{\wedge}4) \times 4) \times 4!]^{\wedge}2 \times [26! \times (16 \times 8) \times 2]\}^{\wedge}2 =$$
$$\{[3.85 \times 10^{\wedge}215] \times [1.14 \times 10^{\wedge}27]^{\wedge}2 \times [1.03 \times 10^{\wedge}29]\}^{\wedge}2 =$$
$$(2.76 \times 10^{\wedge}597)$$

c) For blocks of 2048 bits, one "numeric set", one "substitution alphabet" and one "ciphering round" (that is to say, by using only one set of keywords CK1, CK2 and CK3):

Product Operator of $(N_i) = ... = [(16 \times 16)!] \times [(16! \times 16! \times$ $$(60 \times 52 \times 44 \times 36 \times 28 \times 20 \times 12 \times 4) \times$$
$$(2^{\wedge}8) \times 4) \times 4!]^{\wedge}2 \times [26! \times (16 \times 16) \times 2] = [8.57 \times 10^{\wedge}506] \times$$
$$[1.42 \times 10^{\wedge}42]^{\wedge}2 \times [2.06 \times 10^{\wedge}29] = (3.61 \times 10^{\wedge}620)$$

Other ways to increase the Strength of the Method:

A multiplying effect will be achieved over the number of options generated by the method (which would have to be explored in a "brute-force" attack—by means of an automatic algorithm), if we increase:

- The number of blocks used to fragment the "base message" (if the number of characters in the "base message" so requires it, while applying the method);
- The number of "operations" used to rearrange the "base message";
- The number of "operations" used to rearrange the "numeric set";
- The number of times a "rearrangement" is applied to the "base message";
- The number of times a "rearrangement" is applied to the "numeric set";
- The number of "substitution operations" applied in the same ciphering process;
- The number of "numeric sets" used in the same ciphering process;
- The number of "substitution alphabets" used in the same ciphering process;
- The number of ciphering processes (character substitution in the "intermediate message");
- Combine some (or all of the) cipher-related described ways, in the same ciphering process.

Notice all of the ways to increase the method's strength we have just mentioned, have to be coded into keywords CK1, CK2 y CK3, including the sequence we may have decided to apply the added elements.

Structure and Length of Keywords for the "Preferred Embodiment"

a) For 512-bit Blocks:

Length of $CK1$ =

Length of $CK2$ (as both keywords share the same structure)

Length of $CK2$ = 4 digits (rearranging rows: numbers from 1 to 4) +

16 Characters (rearranging columns: letters from "A" to "P") +

"Rotation Direction" $(+/-)$ +

"Rotation Displacement" ("G" positions such that: $0 \leq G \leq 64$) +

"Type of Reflection" ($V$ = Vertical; $H$ = Horizontal; $L$ = Left Diagonal;

$R$ = Right Diagonal) + "Numeric Set" Code(for ex., with 3 character =

$26^\wedge 3$ different codes for numeric sets = 17.576 codes). =

4 digits + 16 characters + 1 character (sign) + 2 digits + 1 character +

3 characters = 27 characters = 216 bits.

Length of $CK3$ =

"Initial Position for Substitution" ("n" such that: $1 \leq n \leq 64$) +

"Touring Direction ($A$ = Ascending/$D$ = Descending)" =

2 digits + 1 character = 3 characters = 24 bits.

b) For 1024-bit Blocks:

Length of $CK1$ =

Length of $CK2$ (as both keywords share the same structure)

Length of $CK2$ = 8 digits (row rearrangement: numbers from 1 to 8) +

16 Characters (column rearrangement: letters from "A" to "P") +

"Rotation Direction" $(+/-)$ +

"Rotation Displacement" ("G" positions such that: $0 \leq G \leq 128$) +

"Type of Reflection" ($V$ = Vertical; $H$ = Horizontal; $L$ = Left Diagonal;

$R$ = Right Diagonal) + "Numeric Set Code" (for example, with 3 character = $26^\wedge 3$ different numeric set codes = 17,576 codes). =

8 digits + 16 characters + 1 character (sign) + 3 digits + 1 character +

3 characters = 32 characters = 256 bits.

Length of $CK3$ =

"Initial Position for Substitution" ("n" such that: $1 \leq n \leq 128$) +

"Touring Direction ($A$ = Ascending/$D$ = Descending)" =

3 digits+1 character = 4 characters = 32 bits.

c) For 2048-bit Blocks:

Length of $CK1$ = Length of $CK2$ = 16 digits (new rows) +

16 Characters (new columns) + "Rotation Direction" $(+/-)$ +

"Rotation Displacement" ("G" positions such that: $0 \leq G \leq 256$) +

"Type of Reflection" ($V$ = Vertical; $H$ = Horizontal; $L$ = Left Diagonal;

$R$ = Right Diagonal) + "Numeric Set Code" (for example, with 3 character = $26^\wedge 3$ different numeric set codes = 17,576 codes). =

16 digits + 16 characters + 1 character (sign) + 3 digits + 1 character +

3 characters = 40 characters = 320 bits.

Length of $CK3$ =

"Initial Position for Substitution" ("n" such that: $1 \leq n \leq 256$) +

"Touring Direction ($A$ = Ascending/$D$ = Descending)" =

3 digits+1 character = 4 characters = 32 bits.

Notice that when we mention a "numeric set code" in the preceding definitions, we are assuming they will allow identifying the elements in a repository of "numeric sets" previously defined to such purpose and known to the correspondent parties.

Thus, we can have such repositories for the substitution alphabets; for the rearranging operations; for the substitution functions; or, even, for the keywords to be used.

The invention claimed is:

1. A method to encrypt data in a system implemented in computational form or in digital integrated circuits, wherein a numeric set is used to cipher a base message making its content unintelligible, the method comprising the following stages:
   (a) defining a base message [A1] with characters of any language, numeric, alphanumeric symbols, ideograms, phonemes, or images, wherein from a total number of characters in the base message [A1], one or more [A1] matrices are built so that the total number of characters in the base message [A1] is contained in the one or more [A1] matrices, the one or more matrices [A1] are of a same size;
   (b) defining a numeric set [B1], contained in one or more [B1] matrices, the numeric set [B1] formed by consecutive numbers from 1 to a size of an individual [A1] matrix of the one or more [A1] matrices, where the size is equal to a product of a number of rows and a number of columns, the numeric set [B1] combinatorially distributed in one or more [B1] matrices of the same size of the individual matrix of the one or more [A1] matrices;
   (c) establishing a first series of four successive rearranging operations that are to be applied to the one or more [A1] matrices to transform the base message [A1] into an intermediate message [A2], contained in one or more [A2] matrices, wherein the first series of the four successive rearranging operations comprise: transposing rows; transposing columns; rotating concentric parallelograms; and reflecting of the one or more [A1] matrices; and the first series is codified with the four successive rearranging operations to be applied to the one or more [A1] matrices forming keyword CK1;
   (d) establishing a second series of the four successive rearranging operations that are to be applied to the one or more [B1] matrices to transform the numeric set [B1] into a new numeric arrangement [B2], contained in one or more [B2] matrices, wherein the four successive rearranging operations for the one or more [B1] matrices are of the same type as those used to rearrange the one or more [A1] matrices; and the second series is codified with the four successive rearranging operations to be applied to the one or more [B1] matrices forming keyword CK2;

(e) applying the keyword CK1 to the base message [A1] _in order to rearrange the base message [A1], thus generating the intermediate message [A2]; and applying the keyword CK2 to the numeric set [B1] in order to rearrange the numeric set [B1], thus generating the new numeric arrangement [B2];

(f) defining a substitution alphabet [A0] by specifying a total number of characters and the characters obtained from the base message [A1], along with a position each of the characters will have in the substitution alphabet [A0], wherein the substitution alphabet [A0] has a circular structure, wherein a character following a last character in the substitution alphabet [A0] corresponds again to a first character in the substitution alphabet [A0] in the circular structure;

(g) establishing, by using the new numeric arrangement [B2], a position in the intermediate message [A2] from which a substitution shall begin and also a touring direction in the intermediate message [A2], wherein the position and touring direction is coded within keyword CK3, wherein the position and touring direction within the keyword CK3 specifies an operation to be followed in order to build a ciphered message [C1], contained in one or more [C1] matrices;

(h) establishing a substitution operation to substitute each character in the intermediate message [A2] with another character which is obtained by displacing in a certain number of positions, a location of an original character within the substitution alphabet [A0], wherein displacement for substitution of characters in the intermediate message [A2] is done progressively or regressively, and in the touring direction of the intermediate message [A2] as defined in the keyword CK3 in order to go forward in the substitution operation; blank spaces, asterisks, numbers and other special characters not defined in the substitution alphabet [A0] remain unmodified in the ciphered message [C1] except for accented vowels, which are handled as non-accented vowels; and in case of having to substitute a character defined in the substitution alphabet [A0] which appears in the intermediate message [A2] in uppercase, a corresponding substitution character also being displayed in uppercase;

(i) initiating a ciphering by identifying in the new numeric arrangement [B2] a position number which corresponds to an initial cipher from which the substitution operation will start and identifying a character located in the position number within the intermediate message [A2];

(j) identifying a position in the substitution alphabet [A0] corresponding to the initial cipher to substitute and establishing a location of a substitution character by moving in the substitution alphabet [A0] from an original position of the initial cipher to substitute as many positions as indicated by the keyword CK3;

(k) substituting the character located in the position number in the intermediate message [A2] by the substitution character identified in the stage (j), thus establishing a first character in the ciphered message [C1], wherein the substitution operation of the stages (i) to (k) is repeated for each successive character within the intermediate message [A2], following the touring direction as defined in the keyword CK3, thus producing the ciphered message [C1];

(l) transmitting to a recipient correspondent an identification code of the numeric set [B1] and the ciphered message [C1], using a communication channel which does not need to be protected;

(m) transmitting to the recipient correspondent the substitution alphabet [A0] or its identification code, and the keywords CK1 to CK3, through a protected channel; and (n) deciphering the ciphered message [C1] by the recipient correspondent by applying the method inversely in the stages (i) to (k), based upon the substitution alphabet [A0], the keywords CK1 to CK3, the ciphered message [C1], and the numeric set [B1] of the stage (b).

2. The method in claim 1, wherein in the stages (a) to (k):

in the stage (a), the characters in the base message [A1] can be coded in American Standard Code for Information Interchange (ASCII), 8-bit Unicode Transformation Format (UTF-8), Unicode or any other form of digital or analogue coding;

in the stage (a), the one or more [A1] matrices are defined in sizes of 16×4, 16×8 or 16×16 characters;

in the stage (a), if the total number of characters in the base message [A1] exceeds the sizes of 16×4, 16×8, or 16×16, the base message [A1] is fragmented in 64-character blocks for a matrix size of 16×4; in 128-character blocks for a matrix size of 16×8; or in 256-character blocks for a matrix size of 16×16;

in the stage (a), the size of each block is coded at the beginning of the keyword CK1;

in the stage (a), if the total number of characters in the base message [A1] or a number of characters in a last fragment of the base message [A1] is smaller than the size of an individual [A1] matrix of the one or more [A1] matrices, a necessary amount of blank spaces are added as padding characters to complete the one or more [A1] matrices;

in the stage (a), a character blank space is used as word spacing in the base message [A1] to complete the one or more [A1] matrices;

in the stage (b), the numeric set [B1] is formed of an ascending or descending set of MxN numbers, wherein M is a number of rows and N is a number of columns of an individual [A1] matrix of the one or more [A1] matrices;

in the stage (b), the numeric set [B1] is obtained by means of a numeric set generator for matrix sizes of 16×4, 16×8 and 16×16; or by selecting the numeric set [B1] from a repository containing a repertoire of numeric sets previously defined and unequivocally identified;

in the stage (b), an identifier of the numeric set [B1] is coded at the beginning of the keyword CK2;

in the stages (c), (d) and (e), in order to rearrange the one or more [A1] matrices, the keyword CK1 is used with a codification of the first series of the four successive rearranging operations that would have been defined for each one of them;

in the stages (c), (d) and (e), in order to rearrange the [B1] matrices, the keyword CK2 is used with a codification of the second series of the four successive rearranging operations that would have been defined for each one of them;

in the stage (f), the substitution alphabet [A0] is obtained from an alphabet generator for matrices of 16×4, 16×8 and 16×16; or by selecting the substitution alphabet [A0] from a repository containing a repertoire of alphabets previously defined and unequivocally identified;

in the stage (f), the substitution alphabet [A0] includes alphabetic characters, alphanumeric characters, special characters, vowels or consonants with spelling accents, numbers, signs, symbols, and icons corresponding to a language and/or to a form of coding being used;

in the stages (f) to (k), the keyword CK3 is used with codification of the original position of substitution and the touring direction of the new numeric arrangement [B2] which are both used to achieve the ciphering of the intermediate message [A2];

in the stage (g), only one new numeric arrangement [B2] and only one substitution alphabet [A0] are used in order to cipher the intermediate message [A2];

in the stages (f) and (g), the numeric set [B1] to be used needs also to be identified within the keyword CK2; and the substitution alphabet [A0] to be used needs also to be identified within the keyword CK3;

in the stages (c) to (g), the keywords CK1 to CK3 are obtained by means of a keyword generator for matrix sizes of 16×4, 16×8 and 16×16; or the keywords CK1 to CK3 are selected from a repository containing a repertoire of keywords previously defined and unequivocally identified;

· the stages (a) to (k), that correspond to a ciphering round, are applied only once for matrix size 16×16; twice for matrix size 16×8; and thrice for matrix size with 16×4 elements, wherein in each case, a corresponding number of keyword trios CK1, CK2, and CK3 are defined; or only one keyword trio is used in all ciphering rounds;

the stages (a) to (k), that correspond to a ciphering round, are applied multiple times for size matrices of 16×16, 16×8 or 16×4 elements; wherein in each case, the corresponding number of keyword trios CK1, CK2 and CK3 are defined; or only one keyword trio is used in all ciphering rounds; or the stages (a) to (k), that correspond to a ciphering round, are applied multiple times for matrices of M×N elements, wherein M is a number of rows and N is a number of columns of an individual [A1] matrix of the one or more [A1] matrices, wherein in each case, a number of keyword trios CK1, CK2 and CK3 that correspond are defined; or only one keyword trio is used in all ciphering rounds.

3. The method of claim 1, wherein in the stages (a) and (b):

the one or more [A1] matrices are defined to a size of M×N characters, wherein M is a number of rows and N is a number of columns of an individual [A1] matrix of the one or more [A1] matrices;

other characters from the substitution alphabet [A0] are used as padding characters in the base message [A1] to complete the one or more [A1] matrices; or several [B1] matrices are generated or selected with the same size and number of the one or more [A1] matrices, each one with a different numeric set [B1].

4. The method of claim 1, wherein in the stages (c) and (d): the four successive rearranging operations of the base message [A1] in the one or more [A1] matrices are omitted so as to be performed after the ciphering, wherein the four successive rearranging operations are to be applied to one or more [C1] matrices generating one or more [C2] matrices.

5. The method of claim 1, wherein in the stages (c), (d) and (e):

to each one of the one or more [A1] matrices and [B1] matrices, equal quartets of different rearranging operations are respectively applied, or different quartets of different rearranging operations are respectively applied; or the rearrangement operations of the one or more [A1] matrices and [B1] matrices are more than four, by repeating or by creating new rearrangement operations; and the keywords CK1 and CK2 define the four successive rearranging operations through their identification codes.

6. The method of claim 1, wherein in the stage (f):

the characters in the substitution alphabet [A0] can be coded in ASCII, UTF-8, Unicode or any other form of digital or analogue way of coding;

to decide a position of every character in the substitution alphabet [A0], a method to rearrange a number of characters it may contain is chosen;

if more than one [A1] matrix is defined in order to contain the base message [A1], a different substitution alphabet [A0] is defined for each [A1] matrix, and has a corresponding effect over the keyword CK3, where the keyword CK3 defines a new definition of the different substitution alphabets [A0] through their identification codes; or when using different substitution alphabets [A0] _for each [A2] matrix within the intermediate message [A2], a sequence used to apply the different substitution alphabets [A0] is selected to cipher the [A2] matrices containing the intermediate message [A2] and generate [C1] matrices containing the ciphered message [C1].

7. The method of claim 1, wherein in the stages (g) and (h):

if more than one [A1] matrix is defined in order to contain the base message [A1], a different initial position of substitution is defined for each [A2] matrix and is defined in the keyword CK3;

if more than one [A1] matrix is defined in order to contain the base message [A1], a different substitution operation is defined for each [A2] matrix and is defined in the keyword CK3;

in the substitution operation, the displacement required to obtain a position of a substitution character is decided based upon: whether the certain number of positions is even or odd; prime or not prime; multiple of a given number or a given number group; or divisor of a given number or divisor of a group of numbers; or a numeric range; or said displacement is obtained based upon a function defined to this purpose; this is defined in the keyword CK3;

if s is a corresponding number of the new numeric arrangement [B2] being processed, the position of the substitution character within the substitution alphabet [A0] is obtained by a promoting operation, the promoting operation promoting or demoting the substitution character by s+1 positions, if s is even; or by promoting or demoting the substitution character by s positions, if s is odd;

when the substitution operation is being applied to more than one ciphering round, the promoting and demoting operation to be used in each round are alternated, while keeping the rest of the substitution operation unchanged;

while using different substitution operations for each [A2] matrix, an order to apply the different substitution operations is selected, in order to cipher [A2] matrices containing the intermediate message [A2] to generate [C1] matrices containing the ciphered message [C1]; this is defined in the keyword CK3;

in case of defining more than one [A1] matrix to contain the base message [A1], all of the [A1] matrices are ciphered by using a different new numeric arrangement [B2] for each [A1] matrix, to rearrange all the [A1] matrices in the stage (e); or all of the [A2] matrices are ciphered by using the same new numeric arrangement [B2] or by using a different new numeric arrangement [B2] for each [A2] matrix; this is defined in the keyword CK3; or while using different new numeric arrangements [B2] to cipher each [A1] matrix if in the stage (e) it was decided not to rearrange them; or while using different new numeric arrangements [B2] in order to cipher each [A2] matrix, the order to apply the different new numeric arrangements [B2] is selected, while ciphering [A1] or [A2] matrices and [C1] matrices containing the ciphered message [C1] are generated; this is defined in the keyword CK3.

8. The method of claim 1, wherein in the stages (g) to (k) if in the stage (e) it was decided to skip the four successive rearranging operations of the one or more [A1] matrices before the substitution operation, rearrangement as in the stage (e) is applied to the one or more [C1] matrices; this is defined in the keywords CK2 and CK3.

9. The method of claim 1, wherein in the stages (f) and (g) the substitution operation is performed more than once, wherein the keyword CK3 will include additional substitution operations, all initial substitution positions, and all touring directions.

10. The method of claim 1, wherein after performing the stages (f) to (k):
making a final transposition of the ciphered message [C1] by defining a transcription operation for which a starting position is chosen in the new numeric arrangement [B2] and by defining a direction for touring the new numeric arrangement [B2] towards a beginning or end of the new numeric arrangement [B2]; such that the new numeric arrangement [B2] has a cyclic structure whereby, from its end, it connects to its beginning; or
creating a [C3] matrix with a same size and with a same number of fragments as a [C1] matrix, wherein to transcribe every fragment of the ciphered message [C1], following for each fragment, an order of the new numeric arrangement [B2] from a starting position chosen for a beginning of the transcription operation; this is defined in the keyword CK3.

11. The method of claim 1, wherein in the stage (l) if the stage (a) defines more than one [A1] matrix to contain the base message [A1], the method will transmit identifiers of all numeric sets [B1] and all identifiers of the substitution alphabets [A0] to an addressee correspondent using the communication channel that does not need to be protected.

12. The method of claim 1, wherein in the stage (m) if the stage (a) defines more than one [A1] matrix to contain the base message [A1], the method will transmit all ciphered messages [C1] contained in [C1], [C2] or [C3] matrices and all of the keywords CK1 to CK3 or their identifiers to an addressee correspondent by using a secure communication channel.

13. The method of claim 1, wherein in the stage (n) if the stage (a) defines more than one [A1] matrix to contain the base message [A1], in order to decipher the ciphered message [C1], the method is applied inversely based upon the substitution alphabets [A0] or their identifiers, the keywords CK1 to CK3 or their identifiers, [C1], [C2] or [C3] matrices containing a ciphered message, and the [B1] matrices with the numeric sets [B1] or their identifiers.

\* \* \* \* \*